(12) United States Patent
Dziurda

(10) Patent No.: US 9,744,902 B2
(45) Date of Patent: Aug. 29, 2017

(54) VEHICLE HEADLIGHT CONTROL

(71) Applicant: GM GLOBAL TECHNOLOGY OPERATIONS LLC, Detroit, MI (US)

(72) Inventor: Robert A. Dziurda, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/947,112

(22) Filed: Nov. 20, 2015

(65) Prior Publication Data
US 2017/0144588 A1    May 25, 2017

(51) Int. Cl.
*B60Q 1/02* (2006.01)
*B60Q 1/14* (2006.01)
*B60Q 1/00* (2006.01)

(52) U.S. Cl.
CPC ......... *B60Q 1/1423* (2013.01); *B60Q 1/0023* (2013.01)

(58) Field of Classification Search
CPC ............................... B60Q 1/085; B60Q 1/143
USPC .......................................................... 315/82
See application file for complete search history.

(56) References Cited

U.S. PATENT DOCUMENTS

| | | | | |
|---|---|---|---|---|
| 4,692,798 A | * | 9/1987 | Seko | B60Q 1/14 250/461.1 |
| 7,315,241 B1 | * | 1/2008 | Daily | G02B 27/01 340/332 |
| 2015/0002014 A1 | * | 1/2015 | Roeckl | B60Q 1/1423 315/82 |
| 2015/0291081 A1 | * | 10/2015 | Kojima | B60Q 1/085 362/466 |

* cited by examiner

*Primary Examiner* — Don Le
(74) *Attorney, Agent, or Firm* — Lorenz & Kopf, LLP

(57) ABSTRACT

Methods and systems are provided for controlling headlight systems of vehicles. In accordance with one embodiment, a vehicle comprises a headlight system, a processor, and a sensor unit. The processor is configured to at least facilitate transmitting one or more light images with an identifiable characteristic from the vehicle via the headlight system. The sensor unit is configured to receive one or more light images. The processor is further configured to at least facilitate determining whether one or more received light images have the identifiable characteristic, and taking an action based at least on part on whether the one or more received light images have the identifiable characteristic.

17 Claims, 3 Drawing Sheets

VEHICLE HEADLIGHT CONTROL

TECHNICAL FIELD

The present disclosure generally relates to the field of vehicles and, more specifically, to methods and systems for controlling vehicle headlight systems and distinguishing if a vehicle's lights are on or off.

BACKGROUND

Many vehicles today have vehicle headlight systems that are operable in two modes. While in a "bright" mode, the headlight system provides light at a relatively larger intensity level with respect to a forward direction of the vehicle. Conversely, when in a "low beam" mode, the headlight system provides light at a relatively smaller intensity with respect to the forward direction of the vehicle (e.g. by dimming the transmitted light and/or by altering a direction of the transmitted light). It may be desirable to provide improved techniques for automatically adjusting the mode of operation for the vehicle headlight system, for example between a high beam mode and a low beam mode.

Accordingly, it is desirable to provide improved methods for controlling vehicle headlight systems, for example for automatically adjusting the mode of operation for the vehicle headlight system, for example between a high beam mode (with a relatively larger intensity or increased projection area with respect to the forward direction of the vehicle) and a low beam mode (with a relatively smaller intensity or reduced project area with respect to the forward direction of the vehicle). It is also desirable to provide systems for providing such vehicle headlight control. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises transmitting one or more light images with an identifiable characteristic from a vehicle via a headlight system of the vehicle, determining whether one or more received light images have the identifiable characteristic, and taking an action based at least on part on whether the one or more received light images have the identifiable characteristic.

In accordance with another exemplary embodiment, a system is provided. The system comprises a sensing unit and a processor. The processor is configured to at least facilitate transmitting one or more light images with an identifiable characteristic from a vehicle via a headlight system of the vehicle. The sensor unit is configured to receive one or more light images. The processor is further configured to at least facilitate determining whether one or more received light images have the identifiable characteristic, and taking an action based at least on part on whether the one or more received light images have the identifiable characteristic.

In accordance with a further exemplary embodiment, a vehicle is provided. The vehicle comprises a headlight system, a processor, and a sensor unit. The processor is configured to at least facilitate transmitting one or more light images with an identifiable characteristic from the vehicle via the headlight system. The sensor unit is configured to receive one or more light images. The processor is further configured to at least facilitate determining whether one or more received light images have the identifiable characteristic, and taking an action based at least on part on whether the one or more received light images have the identifiable characteristic.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
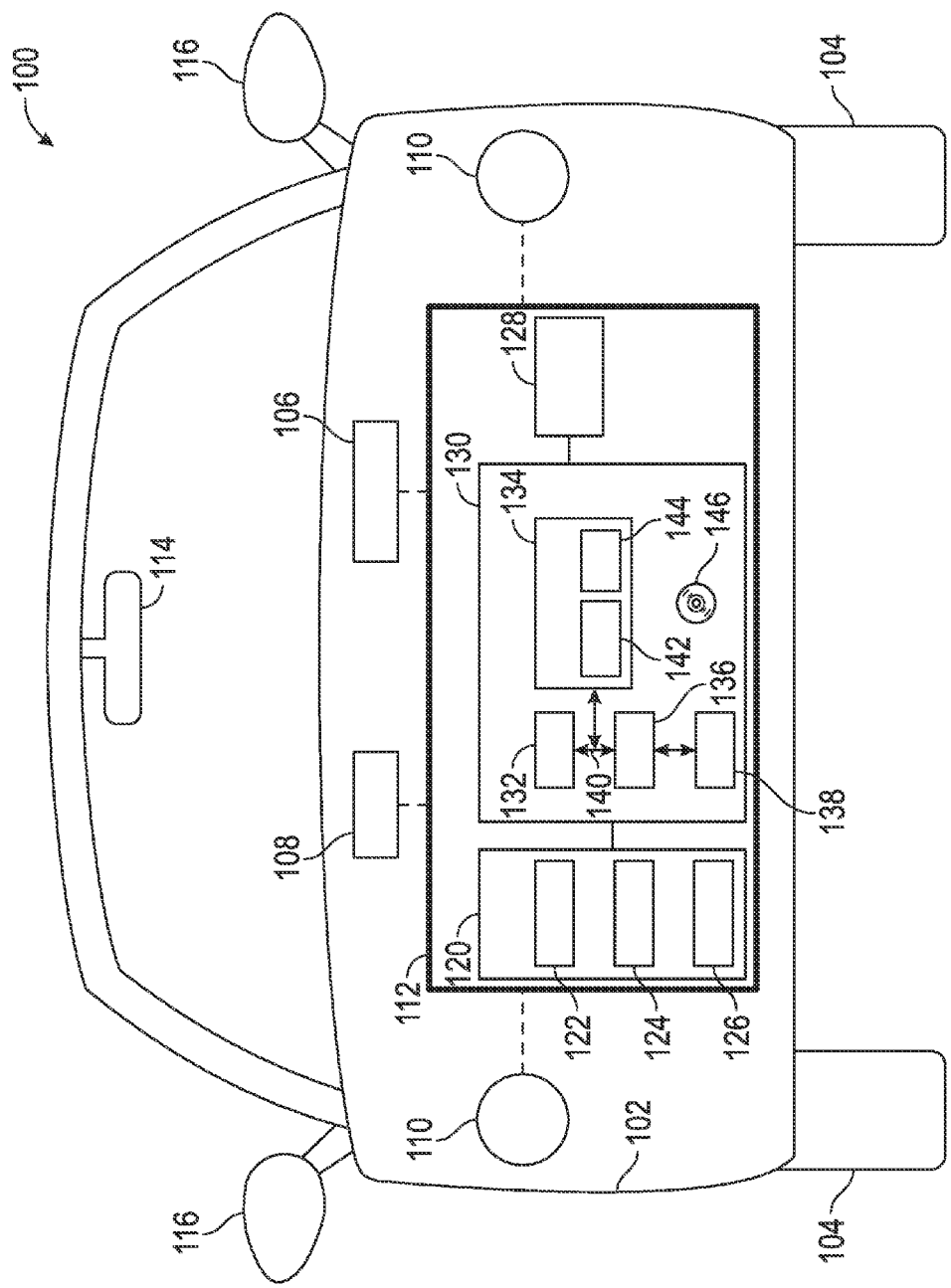
FIG. 1 is a functional block diagram of a vehicle that includes a vehicle headlight system and a control system for controlling the vehicle headlight system, in accordance with an exemplary embodiment.

FIG. 1 illustrates a vehicle 100, or automobile, according to an exemplary embodiment. As described in greater detail further below, the vehicle 100 includes a headlight system 110 and a control system 112 that controls the headlight system 110. As discussed in further detail further below, the control system 112 utilizes an identifiable characteristic of light images from the headlight system 110 for adjusting operation of the headlight system 110. Specifically, in one embodiment, the control system 112 automatically adjusts the mode of operation of the headlight system 110 from the high beam mode to the low beam mode based on whether received light images are consistent with the identifiable characteristic of the light images that were transmitted from the vehicle 100 via the headlight system 110.

As depicted in FIG. 1, the vehicle 100 includes, in addition to the above-referenced control system 112, a body 102, four wheels 104, a propulsion system 106, and an energy storage system (ESS) (e.g. battery) 108. In one embodiment, the body 102 is arranged on a chassis (not depicted), and substantially encloses the other components of the vehicle 100. In one embodiment, the body 102 and the chassis may jointly form a frame. The wheels 104 are each rotationally coupled to the chassis near a respective corner of the body 102. In various embodiments the vehicle 100 may differ from that depicted in FIG. 1. For example, in certain embodiments the number of wheels 104 may vary.

In various embodiments, the propulsion system 106 is mounted on the chassis that drives the wheels 104. In one embodiment, the propulsion system 106 includes an engine, such as a combustion engine. In other embodiments, the propulsion system 106 may include one or more other types of engines and/or motors, such as an electric motor/generator, instead of or in addition to the combustion engine. Also in certain embodiments, the propulsion system 106 may include and/or be coupled to one or more drive shafts to drive the wheels 104.

In various embodiments, the ESS 108 is mounted on the chassis. Also in various embodiments, the ESS 108 comprises a battery having a pack of battery cells. In one embodiment, the ESS 108 comprises a lithium iron phosphate battery, such as a nanophosphate lithium ion battery. In various embodiments, the ESS 108 along with the propulsion system 106 provide a drive system to propel the vehicle 100. In various embodiments, the ESS 108 provides current and/or voltage for operation of the headlight system 110, based on instructions provided by the control system 112. In various embodiments, the ESS 108 also powers various other vehicle systems and/or sub-systems, such as vehicle air conditioning systems and/or other climate control systems, automatic door locks, automatic seat adjustment mechanisms, radios and/or other entertainment and/or infotainment systems, and so on. In addition, in certain embodiments, the ESS 108 provides charging for an electric motor of the propulsion system 106.

The headlight system 110 provides light images (e.g. light beams) outward from the vehicle, for example for use at nighttime or when it is otherwise relatively dark outside the vehicle 100. In one embodiment, the headlight system 110 is operable in two alternate modes. Specifically, in a first mode (referred to herein as a "high beam mode", and which may alternatively be referred to as a "bright mode", or as the "brights" for the vehicle 100's headlight system 110), light is emitted from the headlight system 110 with a relatively larger intensity with respect to a forward direction of travel of the vehicle. Conversely, in a second mode (referred to herein as a "low beam mode", or when the vehicle lights are "on" but not in "high beam" mode), light is emitted from the headlight system 110 with a relatively smaller intensity with respect to a forward direction of travel of the vehicle. The operational mode of the headlight system 110 may be selected by a driver of the vehicle 100. In addition, in one embodiment, the control system 112 controls various operations of the headlight system 110, including an automatic adjustment of the operational mode (e.g. from the high beam mode to the low beam mode) for the headlight system 110 under appropriate circumstances, as discussed in greater detail below.

As discussed above, the control system 112 controls various operations of the headlight system 110. The control system 112 utilizes an identifiable characteristic of light images from the headlight system 110 for adjusting operation of the headlight system 110. Specifically, in one embodiment, the control system 112 automatically adjusts the mode of operation of the headlight system 110 from the high beam mode to the low beam mode based on whether received light images are consistent with the identifiable characteristic of the light images that were transmitted from the vehicle 100 via the headlight system 110 (e.g. based on whether or not another vehicle detected in proximity to the vehicle 100 has lights that are powered on and/or whether another vehicle detected in proximity to the vehicle 100 is stationary or moving).

In the depicted embodiment, the control system 112 comprises a sensor array 120, a user interface 128, and a controller 130. In one embodiment, the control system 112 is mounted on the chassis.

The sensor array 120 (also referred to therein as the "sensing unit") measures parameters for use by the control system 112 in controlling operation of the headlight system 110. In the depicted embodiment, the sensor array 120 includes one or more cameras 122, light sensors 124, and detection sensors 126.

The one or more cameras 122 receive data from outside the vehicle 100. In one embodiment, the one or more cameras 122 receive light images (e.g. light beams) that are travelling toward the vehicle 100. Such received light images may include (A) light images that originated from the vehicle 100 and that are returning to the vehicle 100 after being reflected from another vehicle or object; and/or (B) light images that originated from another source, such as from another vehicle. Also in certain embodiments, the one or more cameras 122 may also be used to detect the presence of one or more other vehicle that may be disposed in proximity to the vehicle 100.

In certain embodiments, one or more light sensors 124 receive data from outside the vehicle 100. In one embodiment, one or more light sensors 124 receive light images that are travelling toward the vehicle 100. Such received light images may include (A) light images that originated from the vehicle 100 and that are returning to the vehicle 100 after being reflected from another vehicle or object; and/or (B) light images that originated from another source, such as from another vehicle.

The one or more detection sensors 126 receive data from outside the vehicle 100. In one embodiment, the one or more detection sensors 126 are used to detect the presence of one or more other vehicle that may be disposed in proximity to the vehicle 100. In various embodiments, the detection sensors 126 may include one or more of the following: one or more radar units, light detection and radar (LIDAR) units, ultrasonic devices, and/or any number of other detection devices.

In one embodiment, the sensor array 120 provides these various types of information to the controller 130 for processing and for use in making the lane determinations. In certain embodiments, one or more such values may be obtained from one or more other vehicle systems, e.g. via a communications unit.

The user interface 128 receives inputs from one or more users of the vehicle 100. In one embodiment, the user interface 128 receives inputs from a driver of the vehicle 100 with respect to the headlight system 110. For example, in one embodiment, the driver utilizes the user interface 128 to turn the lights of the headlight system 110 and on off, and to manually change the headlight system 110 between operation in the high beam mode and low beam mode of operation. In various embodiments, the user interface 128 may include one or more buttons, switches, dials, touch screens, and/or any number of other types of input devices.

The controller 130 is coupled to the sensor array 120, and the user interface 128. The controller 130 processes the data and information received from the sensor array 120 and the user interface 128, and controls various operations of the headlight system 110 using the various data and information, in accordance with the steps of the process described further below in connection with FIGS. 2-4.

In the depicted embodiment, the controller 130 comprises a computer system. In certain embodiments, the controller 130 may also include one or more of the sensor array 120, the user interface 128, and/or components thereof. In addition, it will be appreciated that the controller 130 may otherwise differ from the embodiment depicted in FIG. 1. For example, the controller 130 may be coupled to or may otherwise utilize one or more remote computer systems and/or other control systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130, preferably in executing the steps of the processes described herein, such as the steps of the process 200 (and any sub-processes thereof) in connection with FIGS. 2-4.

The memory 134 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 for use in making the lane determinations. In one such embodiment, the stored values 144 comprise map data that includes a mapping of the roadway on which the vehicle is travelling.

The bus 140 serves to transmit programs, data, status and other information or signals between the various components of the computer system of the controller 130. The interface 136 allows communication to the computer system of the controller 130, for example from a system driver and/or another computer system, and can be implemented using any suitable method and apparatus. It can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 142 that executes one or more embodiments of one or more processes of the present disclosure, such as the steps of the process 200 (and any sub-processes thereof) of FIGS. 2-4, described further below. In another exemplary embodiment, the program product may be directly stored in and/or otherwise accessed by the memory 134 and/or a disk (e.g., disk 146), such as that referenced below.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 130 may also otherwise differ from the embodiment depicted in FIG. 2, for example in that the computer system of the controller 130 may be coupled to or may otherwise utilize one or more remote computer systems and/or other control systems.

Figure 2:
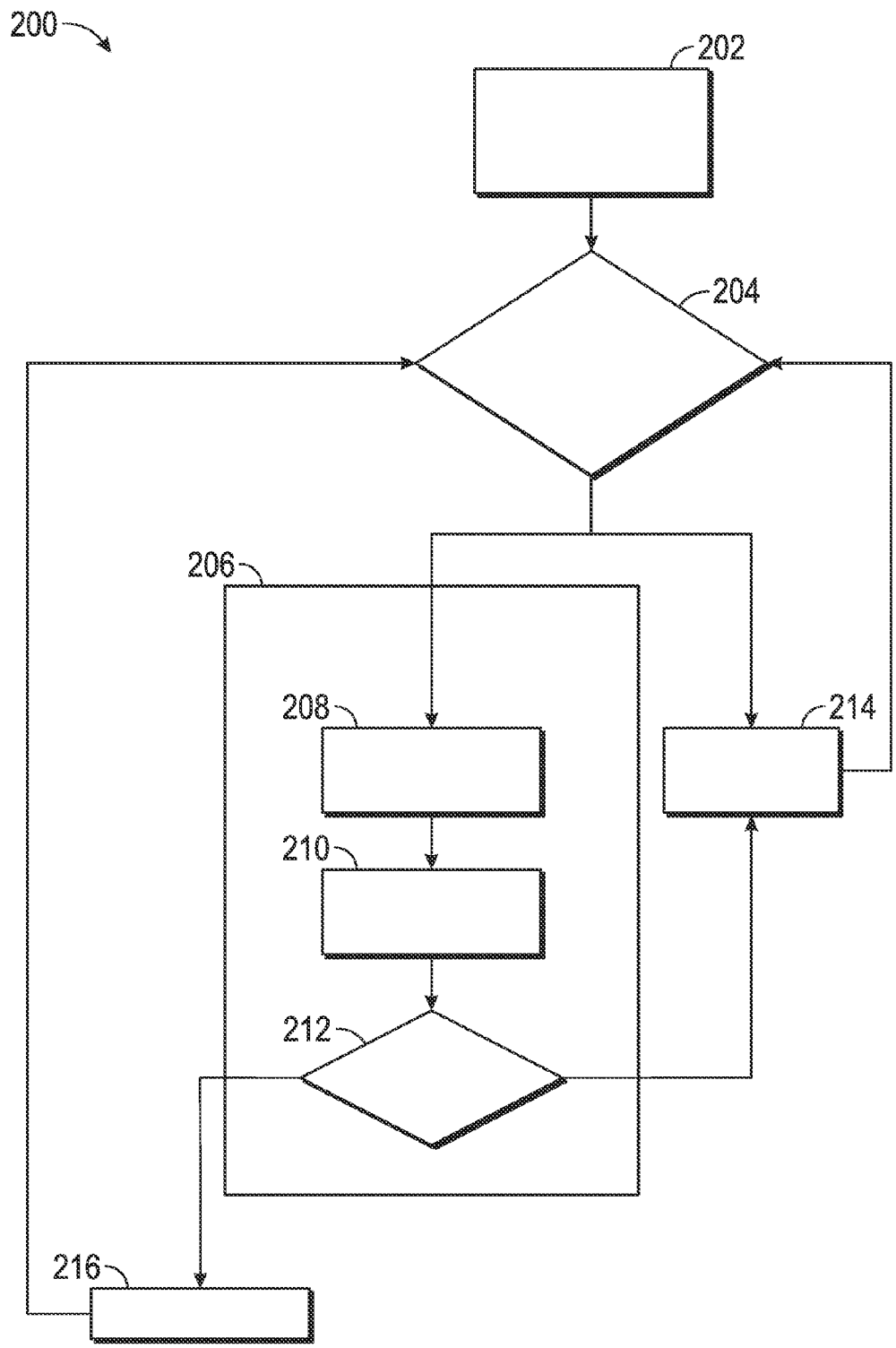
FIG. 2 is a flowchart of a process for controlling a vehicle headlight system of a vehicle, and that can be used in connection with the vehicle and the control system of FIG. 1, in accordance with an exemplary embodiment.

FIG. 2 is a flowchart of a process 200 for controlling a headlight system of a vehicle, in accordance with an exemplary embodiment. The process 200 can be implemented in connection with the vehicle 100, including the headlight system 110 and the control system 112 thereof, in accordance with an exemplary embodiment. The process 200 will also be described further below in connection with FIGS. 3 and 4, which depict illustrations of exemplary light image characteristics that may be used in certain implementations of the process of FIG. 2, in accordance with exemplary embodiment. In one embodiment, the process 200 is performed continuously during a current drive cycle (or ignition cycle) of the vehicle.

The process includes the step of receiving inputs for activation of the headlight system in a high beam mode (step 202). In one embodiment, the input is provided by the driver via the user interface 128 of FIG. Also in one embodiment, the headlight system 110 of the vehicle 100 of FIG. 1 is turned "on" in the "high beam" mode (discussed above in connection with FIG. 1) as part of step 202.

In certain embodiments, a possible other vehicle is detected in proximity to the vehicle 100 (step 204). In one embodiment, one or more sensors of the sensor array 120 of FIG. 1 detects an object or device that appears to be of a shape and size consistent with that of a vehicle (e.g. an automobile, truck, van, sedan, bus, or the like). In certain embodiments, the possible other vehicle is detected by one or more cameras 122 of FIG. 1. In various embodiments, the possible other vehicle is detected by one or more detection sensors 126 of FIG. 1 (e.g. radar units, LIDAR units, ultrasonic devices, or the like). In various embodiments, it will be appreciated that multiple possible other vehicles are detected in step 204.

If one or more other vehicles are detected in proximity to the vehicle 100 in step 204, then in one embodiment the process proceeds to sub-process 206, in which testing is conducted. In one embodiment, during step 206 testing is performed to determine whether another vehicle detected in step 204 is stationary versus moving and/or whether another vehicle detected in step 204 has vehicle lights that are powered on. In addition, in one embodiment, during step 206 testing is performed to determine whether the detection in step 204 provides a "false positive" with respect to whether one or more other moving vehicles have been detected (and/or with respect to whether one or more other vehicles have been detected with their vehicle lights powered on) that may require an adjustment of the headlight system 110 to the low beam mode.

As depicted in FIG. 2, in one embodiment sub-process 206 begins with the introduction of an identifiable characteristic into light images (e.g. light beams) transmitted via the headlight system 110 of the vehicle 100 of FIG. 1 (step 208). In one embodiment, as part of step 208, one or more light images are transmitting with a modulated frequency (e.g. a different frequency as the other light images ordinarily transmitting via the headlight system 110) from the vehicle 100 via the headlight system 110. In another embodiment, as part of step 208, a plurality of light images are transmitted with a known pattern from the vehicle 100 via the headlight system 110. Also in one embodiment, and also as part of step 208, tracking is performed as the light images are transmitted from the vehicle 100 in accordance with the pattern, so that a record is kept as to where in the pattern the transmitted light images from the vehicle 100 are at any particular point in time. In certain embodiments, a randomly generated pattern may be utilized. In addition, in various embodiments, step 208 is performed via instructions provided by the processor 132 of FIG. 1 to the headlight system 110 of FIG. 1 and that are implemented via the headlight system 110.

Figure 3:
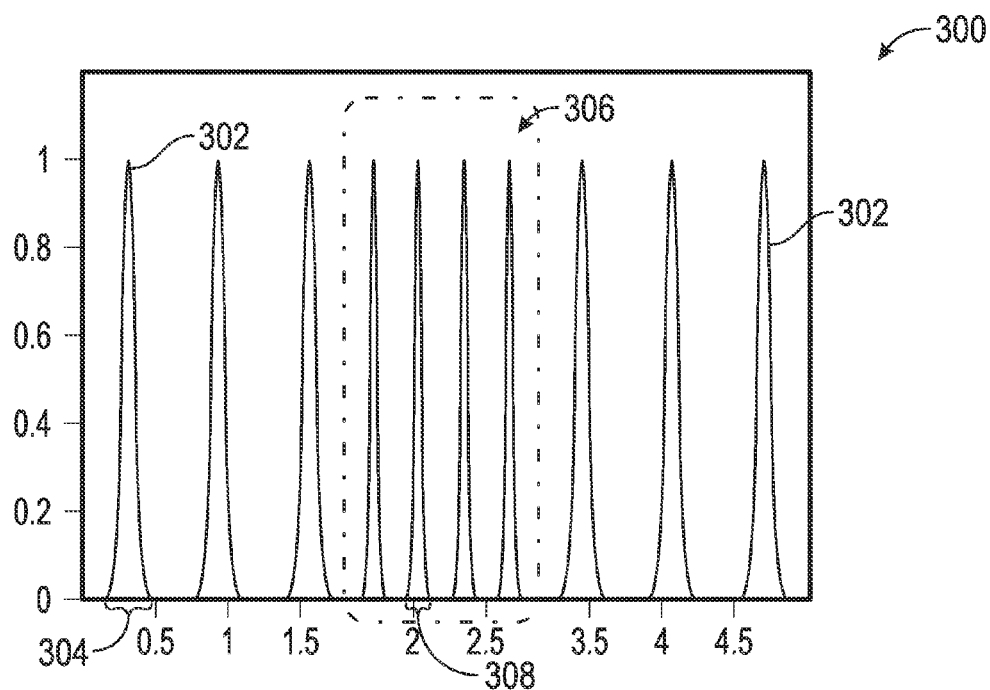
FIGS. 3 and 4 are illustrations of exemplary light image characteristics that may be used in certain implementations of the process of FIG. 2, in accordance with exemplary embodiments.
Figure 4:
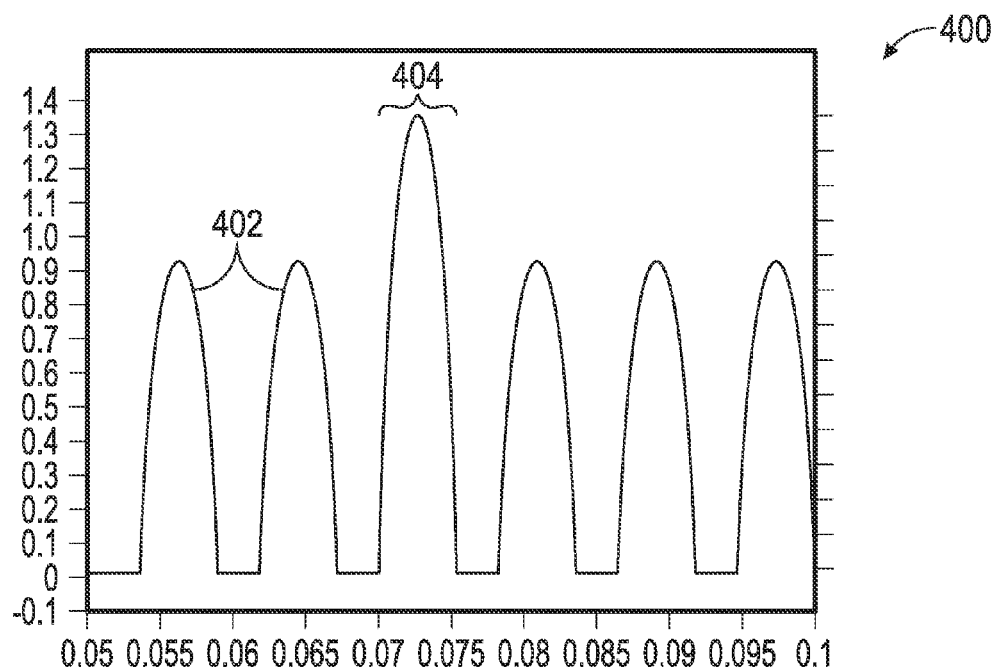

With reference to FIGS. 3 and 4, illustrations of exemplary light image identifiable characteristics of step 208 are provided, in accordance with exemplary embodiments. In each of FIGS. 3 and 4, the x-axis represents time (e.g. in seconds), and the y-axis represents current (e.g. in amps).

First, with reference to FIG. 3, an illustration 300 is provided with respect to the transmission of various light images (e.g. beams) 302 via the headlight system 110 of the vehicle 100 of FIG. 1, in accordance with instructions provided by the processor 132 of FIG. 1, in accordance with a first exemplary embodiment. In the example of FIG. 3, the standard transmission of light images from the headlight system 110 is represented at a first frequency, resulting in a first spacing 304 (or time lag) between light images. Also in this embodiment, during step 208, an injected burst 306 is transmitted from the headlight system 110 with a modified transmission frequency, as the identifiable characteristic of the light images. In the example of FIG. 3, during the injected burst 306, the light images 302 are transmitting approximately twice as quickly as during the standard operation (i.e., with twice the transmission frequency), so that a modulated spacing 308 during the injected burst 306 is approximately equal to one half of the first spacing 304 of the standard transmission.

Second, with reference to FIG. 4, an illustration 400 is provided with respect to the transmission of various light images (e.g. beams) 402 via the headlight system 110 of the vehicle 100 of FIG. 1, in accordance with instructions provided by the processor 132 of FIG. 1, in accordance with a second exemplary embodiment. In the example of FIG. 4, during period 404, an intensity of the light images 402 is varied, while the period is held constant. In the particular example depicted in FIG. 4 the peak current during period 404 is approximately one and one half (1.5) times the peak current in the remaining time periods; however, this amount may vary in other embodiments.

With reference again to FIG. 2, light images (e.g. beams) are received and monitored at the vehicle 100 (step 210). In various embodiments, the received light images may include (A) light images that originated from the vehicle 100 and that are returning to the vehicle 100 after being reflected from another vehicle or object; and/or (B) light images that originated from another source, such as from another vehicle. In one embodiment, one or more cameras 122 receive the light images in step 210. In certain embodiments, one or more other sensors (e.g. light sensors 124) may receive the light images in step 210. In one embodiment, the light images of step 210 are monitored by the processor 132 of FIG. 1 as part of step 210.

A determination is made as to whether the received light images of step 210 include the identifiable characteristic of the transmitted light images of step 208 (step 212). In one embodiment, this determination is made by the processor 132 of FIG. 1. For example, in one embodiment, if the processor 132 determines that one or more of the light images received in step 210 have the same modulated frequency of the transmitted light images of step 208 (e.g., such as the modulated frequency depicted in FIG. 3 in one exemplary embodiment), then the received light images are deemed to have the identifiable characteristic. In another embodiment, if the processor 132 determines that one or more of the light images received in step 208 have the same pattern of the transmitted light images of step 208 (e.g., such as the patterns depicted in FIG. 4, in one exemplary embodiment), then the received light images are deemed to have the identifiable characteristic. Also in one embodiment, if the pattern of the received light images of step 210 is consistent with the pattern of the transmitted light images of step 208, then the received light images are deemed to have the identifiable characteristic only on the further condition that the received light images of step 210 represent a place within the pattern that is consistent with the place within the pattern of the current transmission of the light images in step 208 (e.g. to distinguish from another vehicle on the road that may use the same pattern, but that may have started the pattern at a different point in time).

One or more actions are taken in steps 214 and/or 216 based on the determination of step 212 as to whether the received light images of step 210 have the identifiable characteristic of the transmitted light images of step 208. Specifically, in one embodiment, a first action is taken in step 214 if it is determined that the received light images of step 210 have the identifiable characteristic of the transmitted light images of step 208, and a second (different) action is taken in step 216 if it is instead determined that the received light images of step 210 do not have the identifiable characteristic of the transmitted light images of step 208.

In one embodiment, during step 214, the headlight system 110 of FIG. 1 remains operation in the high beam mode if it is determined in step 212 that the received light images of step 210 have the identifiable characteristic of the transmitted light images of step 208. Specifically, in one embodiment, this determination is interpreted as meaning that the vehicle or object detected in step 204 is not a moving vehicle (e.g., because if this were another vehicle that is moving at night, then presumably the other vehicle would have its own lights on that effectively overpower, mask, or wash out the identifiable characteristic). Accordingly, because there is not another moving vehicle in proximity to the vehicle 100, the headlight system 110 is automatically maintained in operation in the high beam mode, via instructions provided by the processor 132 of FIG. 1. For example, the intensity and direction of the light images transmitted via the headlight system 110 of FIG. 1 may remain the same, in one embodiment. In addition, in one embodiment, the action may comprise a determination that another vehicle detected in step 204 is stationary. Such determinations/classifications of the other vehicle and/or object may also be used as inputs and/or parameters for various other vehicle systems and/or algorithms, such as for autonomous driving vehicles. As depicted in FIG. 2, in one embodiment, the process returns to step 204 following step 214.

Conversely, in one embodiment, during step 216, the headlight system 110 of FIG. 1 is automatically adjusted to operation in the low beam mode if it is determined in step 212 that the received light images of step 210 do not have the identifiable characteristic of the transmitted light images of step 208. Specifically, in one embodiment, this determination is interpreted as meaning that the vehicle or object detected in step 204 is a moving vehicle with its lights on (e.g., because the lights of the moving vehicle have overpowered, masked, or washed away the identifiable characteristic, and instead the light images of the other vehicle are received by the vehicle 100). Accordingly, because there is another moving vehicle in proximity to the vehicle 100, the headlight system 110 is adjusted to the low beam mode, via instructions provided by the processor 132 of FIG. 1. For example, the intensity of the light images transmitted via the headlight system 110 may be reduced, and/or the direction of transmission of the light images may be adjusted so that the intensity is reduced with respect to the forward direction of travel of the vehicle 100. In addition, in one embodiment, the action may comprise a determination that another vehicle detected in step 204 is moving. Such determinations/classifications of the other vehicle and/or object may also be used as inputs and/or parameters for various other vehicle systems and/or algorithms, such as for autonomous driving vehicles. In one embodiment, the process returns to step 204 following step 216.

With reference again to step 204, if it is determined in step 204 that no potential vehicles are detected in proximity to the vehicle 100, then in one embodiment the process proceeds directly from step 204 to the above-referenced step 214. Accordingly, in one embodiment, the headlight system continues to operate in the high beam mode.

Also with further reference to step 204, while sub-process 206 is depicted in FIG. 2 as occurring only if a possible vehicle is detected in step 204, in certain embodiments the sub-process 206 may be performed (in whole or in part) regardless of whether a possible vehicle is detected in step 204. For example, in one embodiment, the identifiable characteristic may be provided within the transmitted light signals in step 208 regardless of whether another vehicle is detected, and/or the presence of such another vehicle may also be determined at least in part based on the received images of step 210, and so on. For example, in certain embodiments, the identifiable characteristic may include the transmission of one or more signals (e.g. infrared signals) that are not visible to the human eye, so that there may not be any inconvenience to the driver to continuous transmission of the identifiable characteristic along with the standard transmission of the light images from the vehicle 100 via the headlight system 110 of FIG. 1. It will be appreciated that, in certain embodiments, the process 200 may also include other variations from that set forth in FIG. 2 and described herein.

Accordingly, methods and systems are provided for controlling headlight systems of vehicles. In one embodiment, light images are transmitted from the vehicle with an identifiable characteristic, and the mode of operation (e.g. full beam or low beam) of the headlight system is automatically controlled via a processor based on whether received light signals include the identifiable characteristic of the transmitted light signal. Accordingly, in one embodiment, the headlight system will automatically continue to operate in a high beam mode if the received light signals have the identifiable characteristic (e.g. if a detected vehicle is stationary), whereas the headlight system will instead automatically be adjusted to operate in the low beam mode if the received light signals do not have the identifiable characteristic (e.g. if the detected vehicle is moving).

It is also noted that the disclosed methods, systems, and vehicles may further be beneficial to active safety and/or autonomous vehicle systems to correctly identify a parked or stationary vehicle (e.g. with no head/tail lamps on). In addition, this information can also be used to help establish the probability that a detected vehicle may move or become a potential hazard.

It will be appreciated that the disclosed methods, systems, and vehicles may vary from those depicted in the Figures and described herein. For example, the vehicle 100, the headlight system 110, control system 112, and/or various components thereof may vary from that depicted in FIG. 1 and described in connection therewith. In addition, it will be appreciated that certain steps of the process 200 may vary from those depicted in FIGS. 2-4 and/or described above in connection therewith. It will similarly be appreciated that certain steps of the process described above (and/or sub-processes or sub-steps thereof) may occur simultaneously or in a different order than that depicted in FIGS. 2-4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method comprising:
   transmitting one or more light images with an identifiable characteristic from a vehicle via a headlight system of the vehicle, wherein the step of transmitting the one or more light images comprises transmitting the one or more light images with a modulated frequency from the vehicle via the headlight system of the vehicle;
   determining whether one or more received light images have the identifiable characteristic, wherein the step of determining whether one or more received light images have the identifiable characteristic comprises determining whether one or more received light images have the modulated frequency; and
   taking an action based at least on part on whether the one or more received light images have the identifiable characteristic, wherein the step of taking the action comprises taking the action based at least on part on whether the one or more received light images have the modulated frequency.

2. The method of claim 1, wherein:
   the step of transmitting the one or more light images further comprises transmitting a plurality of light images with a known pattern from the vehicle via the headlight system of the vehicle;
   the step of determining whether one or more received light images have the identifiable characteristic further comprises determining whether a plurality of received light images have the known pattern; and
   the step of taking the action further comprises taking the action based at least on part on whether the plurality of received light images have the known pattern.

3. The method of claim 2, further comprising:
   tracking the known pattern as the plurality of light images are transmitted; and if the plurality of received light images have the known pattern, determining whether the plurality of received light images are consistent with the tracking of the known pattern;
wherein the step of taking the action comprises taking the action based also at least on part on whether the plurality of received light images are consistent with the tracking of the known pattern.

4. The method of claim 1, wherein:
the headlight system is configured to operate in a first setting, in which light images are transmitted with a first level of intensity with respect to a forward direction of travel of the vehicle, and a second setting, in which light images are transmitted with a second level of intensity with respect to the forward direction of travel of the vehicle, the second level of intensity being greater than the first level of intensity;
the step of transmitting the one or more light images comprises transmitting the one or more light images with the identifiable characteristic from the vehicle via the headlight system while the headlight system is operating in the second setting; and
the step of taking the action comprises:
continuing to operate the headlight system in the second setting if the one or more received light images have the identifiable characteristic;
operating the headlight system in the first setting, instead of the second setting, if the one or more received light images do not have the identifiable characteristic.

5. The method of claim 1, further comprising:
detecting one or more other vehicles in proximity to the vehicle;
wherein the step of transmitting the one or more light images comprises transmitting the one or more light images with the identifiable characteristic from the vehicle via the headlight system, after the one or more other vehicles are detected in proximity to the vehicle.

6. The method of claim 1, further comprising:
detecting one or more other vehicles in proximity to the vehicle;
wherein the step of taking the action comprises:
determining that the one or more other vehicles' lights are not powered on if the one or more received light images have the identifiable characteristic; and
determining that the one or more other vehicles' lights are powered on if the one or more received light images do not have the identifiable characteristic.

7. A system comprising:
a processor configured to at least facilitate transmitting one or more light images with a modulated frequency from a vehicle via a headlight system of the vehicle; and
a sensor unit configured to receive one or more light images;
wherein the processor is further configured to at least facilitate:
determining whether one or more received light images have the modulated frequency; and
taking an action based at least on part on whether the one or more received light images have the modulated frequency.

8. The system of claim 7, wherein the processor is configured to at least facilitate:
transmitting a plurality of light images with a known pattern from the vehicle via the headlight system;
determining whether a plurality of received light images have the known pattern; and
taking the action based at least on part on whether the plurality of received light images have the known pattern.

9. The system of claim 8, wherein the processor is configured to at least facilitate:
tracking the known pattern as the plurality of light images are transmitted;
if the plurality of received light images have the known pattern, determining whether the plurality of received light images are consistent with the tracking of the known pattern; and
taking the action based also at least on part on whether the plurality of received light images are consistent with the tracking of the known pattern.

10. The system of claim 7, wherein:
the headlight system is configured to operate in a first setting, in which light images are transmitted with a first level of intensity with respect to a forward direction of travel of the vehicle, and a second setting, in which light images are transmitted with a second level of intensity with respect to the forward direction of travel of the vehicle, the second level of intensity being greater than the first level of intensity; and
the processor is configured to at least facilitate:
transmitting the one or more light images with the modulated frequency from the vehicle via the headlight system while the headlight system is operating in the second setting; and
continuing to operate the headlight system in the second setting if the one or more received light images have the modulated frequency; and
operating the headlight system in the first setting, instead of the second setting, if the one or more received light images do not have the modulated frequency.

11. The system of claim 7, wherein:
the sensor unit is configured to at least facilitate detecting one or more other vehicles in proximity to the vehicle; and
the processor is configured to at least facilitate transmitting the one or more light images with the modulated frequency from the vehicle via the headlight system, after the one or more other vehicles are detected in proximity to the vehicle.

12. The system of claim 7, wherein:
the sensor unit is configured to at least facilitate detecting one or more other vehicles in proximity to the vehicle; and
the processor is configured to at least facilitate:
determining that the one or more other vehicles' lights are not powered on if the one or more received light images have the modulated frequency; and
determining that the one or more other vehicles' lights are powered on if the one or more received light images do not have the modulated frequency.

13. A vehicle comprising:
a headlight system;
a processor configured to at least facilitate transmitting one or more light images with an identifiable characteristic from the vehicle via the headlight system; and
a sensor unit configured to receive one or more light images vehicle and to at least facilitate detecting one or more other vehicles in proximity to the vehicle;
wherein the processor is further configured to at least facilitate:

determining whether one or more received light images have the identifiable characteristic;

taking an action based at least on part on whether the one or more received light images have the identifiable characteristic, wherein the taking the action comprises:

determining that the one or more other vehicles' lights are not powered on if the one or more received light images have the identifiable characteristic; and determining that the one or more other vehicles' lights are powered on if the one or more received light images do not have the identifiable characteristic.

14. The vehicle of claim 13, wherein the processor is configured to at least facilitate:

transmitting a plurality of light images with a known pattern from the vehicle via the headlight system;

determining whether a plurality of received light images have the known pattern; and taking the action based at least on part on whether the plurality of received light images have the known pattern.

15. The vehicle of claim 13, wherein the processor is configured to at least facilitate:

transmitting the one or more light images with a modulated frequency from the vehicle via the headlight system;

determining whether one or more received light images have the modulated frequency; and taking the action based at least on part on whether the one or more received light images have the modulated frequency.

16. The vehicle of claim 13, wherein:

the headlight system is configured to operate in a first setting, in which light images are transmitted with a first level of intensity with respect to a forward direction of travel of the vehicle, and a second setting, in which light images are transmitted with a second level of intensity with respect to the forward direction of travel of the vehicle, the second level of intensity being greater than the first level of intensity; and the processor is configured to at least facilitate:

transmitting the one or more light images with the identifiable characteristic from the vehicle via the headlight system while the headlight system is operating in the second setting; and continuing to operate the headlight system in the second setting if the one or more received light images have the identifiable characteristic; and operating the headlight system in the first setting, instead of the second setting, if the one or more received light images do not have the identifiable characteristic.

17. The vehicle of claim 13, wherein:

the sensor unit is configured to at least facilitate detecting one or more other vehicles in proximity to the vehicle; and the processor is configured to at least facilitate transmitting the one or more light images with the identifiable characteristic from the vehicle via the headlight system, after the one or more other vehicles are detected in proximity to the vehicle.

* * * * *